United States Patent [19]
Houck

[11] 3,855,510
[45] Dec. 17, 1974

[54] HIGH STABILITY MULTIPLE SPEED MOTOR POWER SUPPLY FOR FACSIMILE

[75] Inventor: Deward J. Houck, Mastic Beach, N.Y.

[73] Assignee: International Scanatron Systems Corp., Wyandanch, N.Y.

[22] Filed: Feb. 15, 1973

[21] Appl. No.: 332,853

Related U.S. Application Data

[63] Continuation of Ser. No. 196,343, Nov. 8, 1971, abandoned.

[52] U.S. Cl. .............. 318/171, 318/227, 318/230, 318/231
[51] Int. Cl. ............................................. H02p 7/42
[58] Field of Search .......... 318/138, 171, 227, 231, 318/230

[56] References Cited
UNITED STATES PATENTS
3,416,057  12/1968  Froyd et al. .................... 318/171 X Primary Examiner—G. Z. Rubinson
Attorney, Agent, or Firm—Alfred W. Barber

[57] ABSTRACT

A high stability motor drive for the scanning or recording motor and the paper advance motor is provided using a high stability crystal oscillator frequency divided to the appropriate frequency for driving the motors and phase splitting to provide a two-phase power source for two-phase motors. Logic circuits perform most of the functions involved. Switched logic circuits provide for predetermined changes in motor drive power frequency to provide a variety of predetermined motor speeds for either the scanning or recording motors and the paper advance motor. Provision is also made for automatically changing the power supply voltage in accordance with the requirements at different motor speeds.

3 Claims, 4 Drawing Figures

MOTOR DRIVE ONE ∅  63 (64, 63', 64')

ns. In order to provide precisely timed
HIGH STABILITY MULTIPLE SPEED MOTOR POWER SUPPLY FOR FACSIMILE This is a continuation, of application Ser. No. 196,343 filed Nov. 8, 1971 now abandoned.

In facsimile scanners and recorders scanning and recording is often accomplished with synchronous motor driven means. Many systems require two motors, one to move the scanning or recording means along a scanning line and the other to move the paper line by line. Two-phase synchronous motors because of their inherent stability and starting characteristics are preferred for these purposes. In order to provide precisely timed scanning and recording, a highly stable and accurate frequency must be provided in the alternating current power supplied to the motors.

Facsimile systems have been built using 60 cycle common power source to drive 60 cycle synchronous motors. Several problems are encountered with such a system. One is that the use of such a system is limited to areas sharing the same 60 cycle power source. Another is that speed changes are not readily made, requiring generally the use of gears and gear shifting devices.

SUMMARY

The system of the present invention uses a highly stable crystal oscillator as its frequency source. This oscillator operates at a frequency of 2,359,296 MHZ while the motors operate with alternating current power of 36 HZ or 72 HZ for 180 RPM or 360 RPM motor speed. In other words the frequency of the alternating current motor power is changed to provide any desired motor speed. The frequency changing from the crystal frequency to the motor power frequency is accomplished by means of a series of solid state integrated circuit frequency dividers. Generally flip-flops are used inherently dividing by a factor of 2. Other factors where desired such as 3 or 4/5 are obtained by pulse skipping techniques using other logic circuits, particularly two input NAND gates. The crystal oscillator provides the basic frequency source for both motors (scanning or recording and paper advance motors) and the logic circuit frequency dividers are common up to a certain point. High and low speed for both motors simultaneously is provided by means of logic circuit switching. Additional logic circuit switching in the circuit of the power for the paper advance motor is provided independent of the power for the scanning or recording motor. Also when the system is switched from low speed to high speed, the voltage to both motors is automatically increased to supply the increased power demands at the higher speeds.

The preferred motors are two-phase synchronous self-starting motors. Phase splitting is provided to provide the two phases. The power is supplied from alternating current power lines, rectified and filtered to provide a direct current source. This direct current is interrupted and divided into two phases 90° apart with an off period of 45° between positive and negative swings to reduce the harmonic content of the voltage over what it would be with pure square wave input to the motors. This also eliminates the large spikes which would result if square wave was used when the voltage is reversed. In the Drawing:

FIGS. 1 and 2 taken together make up a complete block diagram of the preferred form of the present invention; FIG. 2 being the portion particularly providing the two-phase, frequency selectable alternating drive current for the paper advance motor; and FIG. 1 being the portion providing the source frequency, direct current power and the scanning/recording two-phase motor.

Figure 1:
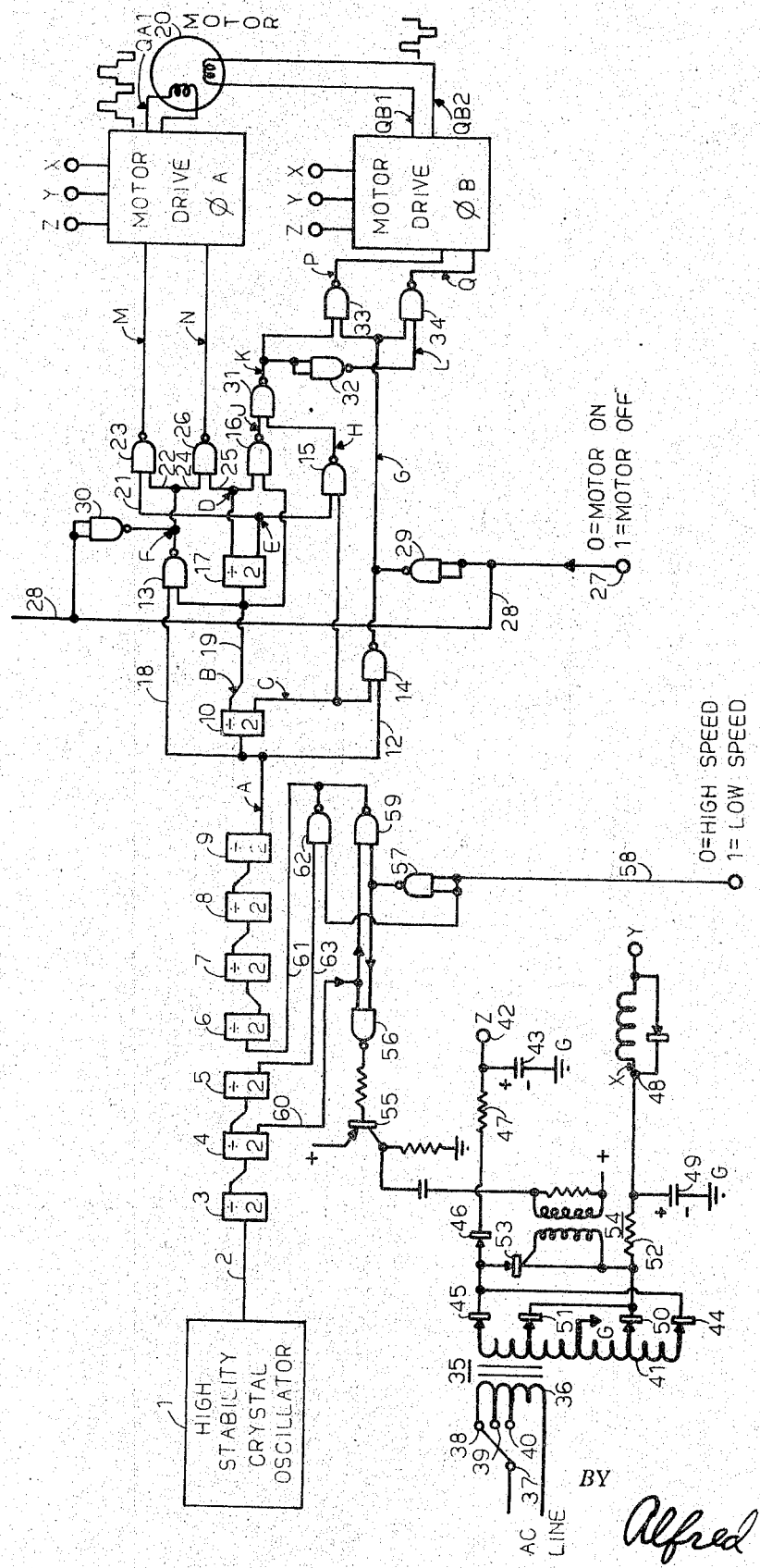

FIG. 1 includes a high stability crystal oscillator 1 the output of which is applied over line 2 to a series of flip-flop dividers the first of which is flip-flop 3. In the preferred form of the present invention crystal oscillator 1 operates at a very accurate frequency of 2,359,296 cycles and is divided by the divider chain of 16 stages by a factor of $2^{16}$. While Fig. 1 does not show all 16 divide by two flip-flops in cascade, it can be assumed that any number required to bring the total to sixteen are interposed between the first flip-flop 3 and the following flip-flop 4. Now, 2,359,296 divided by $2^{16}$ is 36 so that starting with a crystal oscillator at 2,359,296 and by dividing this frequency by 2—16 times a frequency of 36 cycles is provided for powering the scanning-/recording or paper advance synchronous motors. Since the dividers (flip-flops) following 3 and 4 comprise flip-flops 5, 6, 7, 8, 9, 10 and 11 it can be assumed the five more flip-flop stages are provided between 3 and 4.

Continuing with the description of the preferred form of the present invention, as described above, the initial high stability crystal controlled oscillator frequency of 2,359,296 is divided in 16 stages of two to one frequency division flip-flop stages, counting back from flip-flop 17 and flip-flop 10 to input on line A, a frequency of 36 × 2 × 2 or 144 cycles per second exists on line A. This is graphically shown on line A of FIG. 4. Line A is connected to the clock input of flip-flop 10 and over lines 18 and 12 to one input respectively of NAND gates 13 and 14 over lines 18 and 12 respectively. Also, the direct output of flip-flop 10 is connected over line B to the clock input of flip-flop 17 and the inverted output over line C to one input of NAND gate 14 and to one input of NAND gate 15. Output over line B is also connected to one input of NAND gate 13 and one input of NAND gate 16. As stated above, with line A (see timing diagram line A of FIG. 4) connected to the clock input of flip-flop 10, output B (line B of the timing diagram of FIG. 4) at half repetition rate is applied to the clock input of flip-flop 17 over line 19 and the inverted output of flip-flop 10 is applied over line C to one input of NAND gate 14 and one input of NAND gate 15. The signal on line C is plotted on line C of FIG. 4. Now, one phase of the power to motor 20 is enabled over lines M and N while the other phase is enabled over lines P and Q. Line M is enabled (high) whenever either of the inputs 21(E) or 22(F) of NAND gate 23 is not high (low) and line N is enabled (high) whenever either of the inputs 24 or 25 of NAND 26 is not high (low). Now, these conditions depend on whether motor on or motor off input is applied to terminal 27 and hence over line 28 to NAND gates 29 and 30. A motor off signal is logic 1 (high) at the input to NAND gates 29 and 30 producing a logic 0 on lines F and G and logic 1 on lines M, N, P and Q. This places a ground on each side of the motor windings (see FIG. 3). A motor on signal is logic 0 (low) at the input to NAND gates 29 and 30 producing logic 1 (high) on lines F and G which combined with the outputs of NAND gates 13 and 14 respectively provide the waves shown in lines F and G of FIG. 4. The wave H in FIG. 4 is produced on line H by NAND gate 15 having inputs C and E. The wave J in FIG. 4 is produced on line J by NAND gate 16 having inputs B and D. The wave K in FIG. 4 is produced on line K by NAND gate 31 having inputs H and J. The wave L is produced on line L by NAND gate 32 having input K and hence is simply the inverse of K. The wave M is produced on line M by NAND gate 23 having inputs E and F. The wave N is produced by NAND gate 26 having inputs D and F. These latter two waves (M and N) provide two of the inputs to motor drive phase A shown in FIG. 3 and described below. The wave P is produced by NAND gate 33 having inputs G and K. The wave Q is produced by NAND gate 34 having inputs G and L. These latter two (P and Q) provide two of the inputs to motor drive phase B shown in FIG. 3 and described below.

Turning to the power supply portion of FIG. 1, a power line transformer 35 is provided with a primary 36 and tap switch 37, 38, 39, 40 for accommodating low, high and normal AC line voltages and a secondary 41. A high DC voltage at terminal 42 (Z) is provided across filter capacitor 43 by rectifiers 44 and 45 connected to the outer ends of secondary 41 through rectifier 46 and filter resistor 47. A low DC voltage at terminal 48 (X) is provided across filter capacitor 49 by rectifiers 50 and 51, connected to taps on secondary 41 and through filter resistor 52. Terminal 48 can be switched from low to high voltage automatically in response to high or low speed switching to be described below. In the low speed, low voltage condition silicon controlled rectifier 53 receives no triggering pulses and hence remains open-circuited and capacitor 49 is charged through rectifiers 50 and 51 providing low voltage output at terminal 48 (X). In the high speed, high voltage condition SCR 53 receives continuous high frequency triggering pulses from pulse transformer 54 relayed by transistor 55 which in turn is pulsed by the output of NAND gate 56 connected to divider 4 and NAND gate 57 the input of which is logic 0 for high voltage, high speed. When SCR 53 is switched on by these continuous triggering pulses, it electronically switches to the higher voltage tap on the transformer. This is accomplished when the side of the transformer with rectifiers 51 and 45 goes positive, rectifier 45 is more positive than 51, therefore, when SCR 53 is conducting, the more positive voltage from rectifier 45 will back bias rectifier 51. On the next half cycle when the winding that has rectifiers 50 and 44 goes positive, 44 is more positive than 50 and when SCR 53 is conducting, this will back bias rectifier 50 disconnecting the lower tap and connecting the higher voltage tap to high voltage output 42. Diode 46 is provided to prevent SCR 53 holding current from flowing from capacitor 43 during the reverse in polarity.

High or low scanning motor speed is provided by placing logic 0 or logic 1 respectively on speed control line 58 providing logic 1 and 0 respectively at the output of NAND gate 57. Now, considering the condition producing high speed first. With logic 0 on line 58 and logic 1 at the output of NAND gate 57, NAND gates 56 and 59 are provided with logic 1 on one input of each. The second input to NAND gate 56 is the Q output of divider stage 4 over line 60 so that every logic 1 from divider stage 4 causes logic 0 to appear at the output of NAND gate 56 and on the base of transistor 55 providing the pulses as described above which turn on SCR 53 providing high motor voltage. At the same time NAND gate 59 similarly provides output pulses which are applied over line 61 to the input to divider stage 6 bypassing stage 5 and thereby one division by 2 thereby doubling the frequency of the divider string output and the frequency applied to the motor (72 cycles). To provide low speed, logic 1 is placed on line 58. The output of NAND gate 57 goes to logic 0 disabling both NAND gates 56 and 59 and their effects (increasing voltage and frequency). The power supply now provides low voltage output. The logic 1 on line 58 goes to one input of NAND gate 62. The other input is provided from the Q output of divider stage 5 so that the output of NAND gate 62 has the pulse frequency of the output of divider stage 5 which is applied over line 61 to the input of divider stage 6. Thus, all divider stages are in the chain and the divider string output and the frequency applied to the motor is low (36 cycles).

Figure 2:
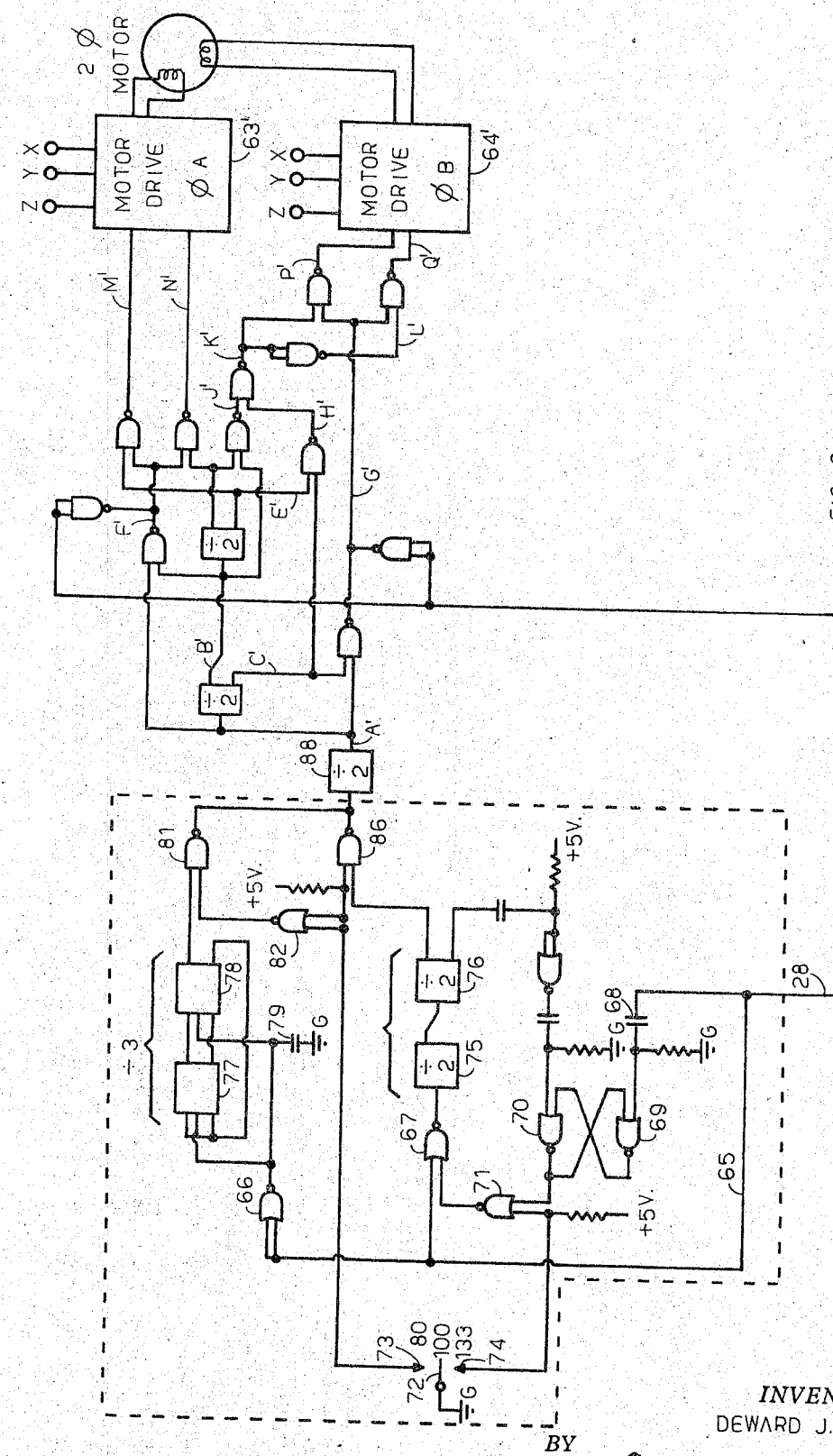

FIG. 2 shows how provision may be made for several different paper advance speeds. The logic starting at A' and continuing to the right to the two motors is similar to that to the right of A in FIG. 1 and operates in the same manner as described above. If only one motor speed is desired the input to divider 88 may be connected to line A of FIG. 1, a suitable point in the divider chain from the frequency control crystal 1. However, provision may be made for changing the paper advance rate by means of the circuits included in the dotted box in FIG. 2. The input line 28 is connected to a suitable point in the divider chain of FIG. 1, say at line A. Now, if switch 72-73-74 is placed in its center position with arm 72 open, the pulses received on line 28 will pass through gate 67, dividers 75, 76 providing a division of 4, gate 86 and divider 88 to line A' and from there through the logic to the motors. The overall division is chosen to provide a paper drive motor speed to advance the paper at the equivalent of 100 lines per inch as shown at switch 72-73-74. If switch arm 72 is closed to 73, gate 86 is opened and gate 81 is closed so that pulses from line 28 go through gate 66 and are divided by 3 in the cross-connected dividers 77 and 78. The division by 3 rather than by 4 results in a higher speed of the paper advance motor and the paper advance will be equivalent to 80 lines per inch as shown at switch 72-73. With switch arm 72 closed to contact 74, the pulses from line 28 will again go through gates 67 and 86 and dividers 75 and 76 providing a division by 4. However, crossed gates 69 and 70 will eliminate one pulse out of every 5 so that a lower frequency will be provided to the paper advance motors equivalent to 133 lines per inch as shown at switch 72-74.

Figure 3:
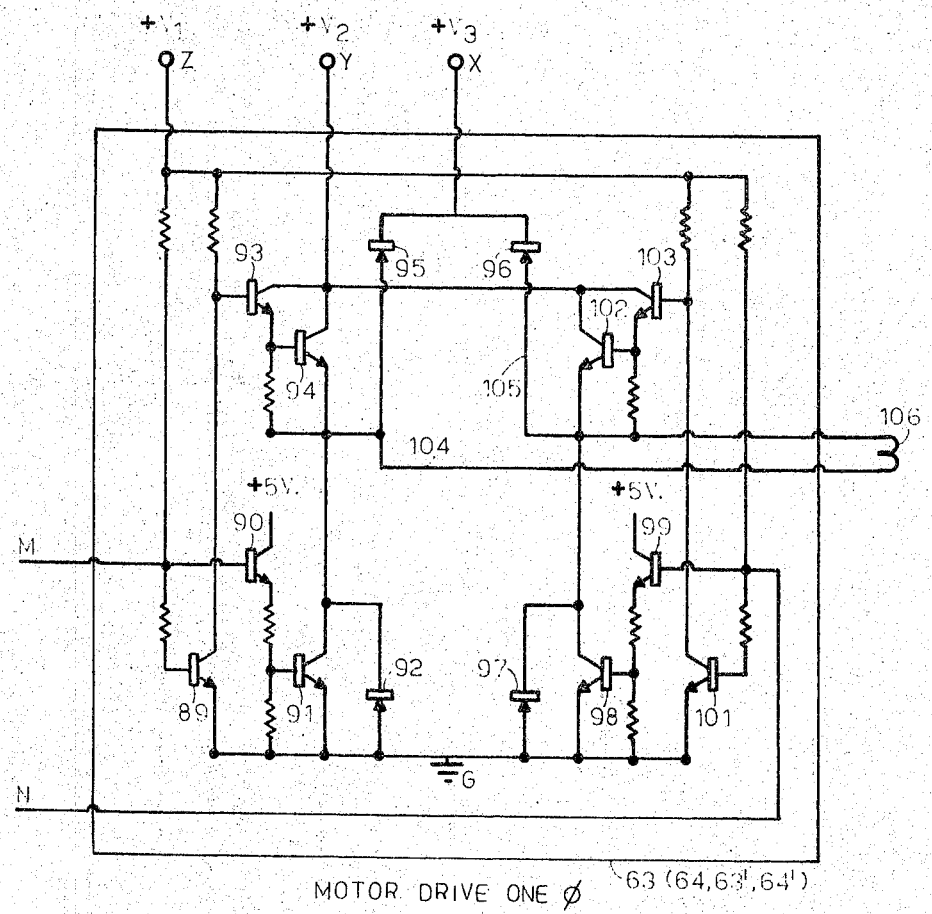
FIG. 3 is a schematic circuit diagram of the coupling circuit between the direct current source and the motors.
Figure 4:
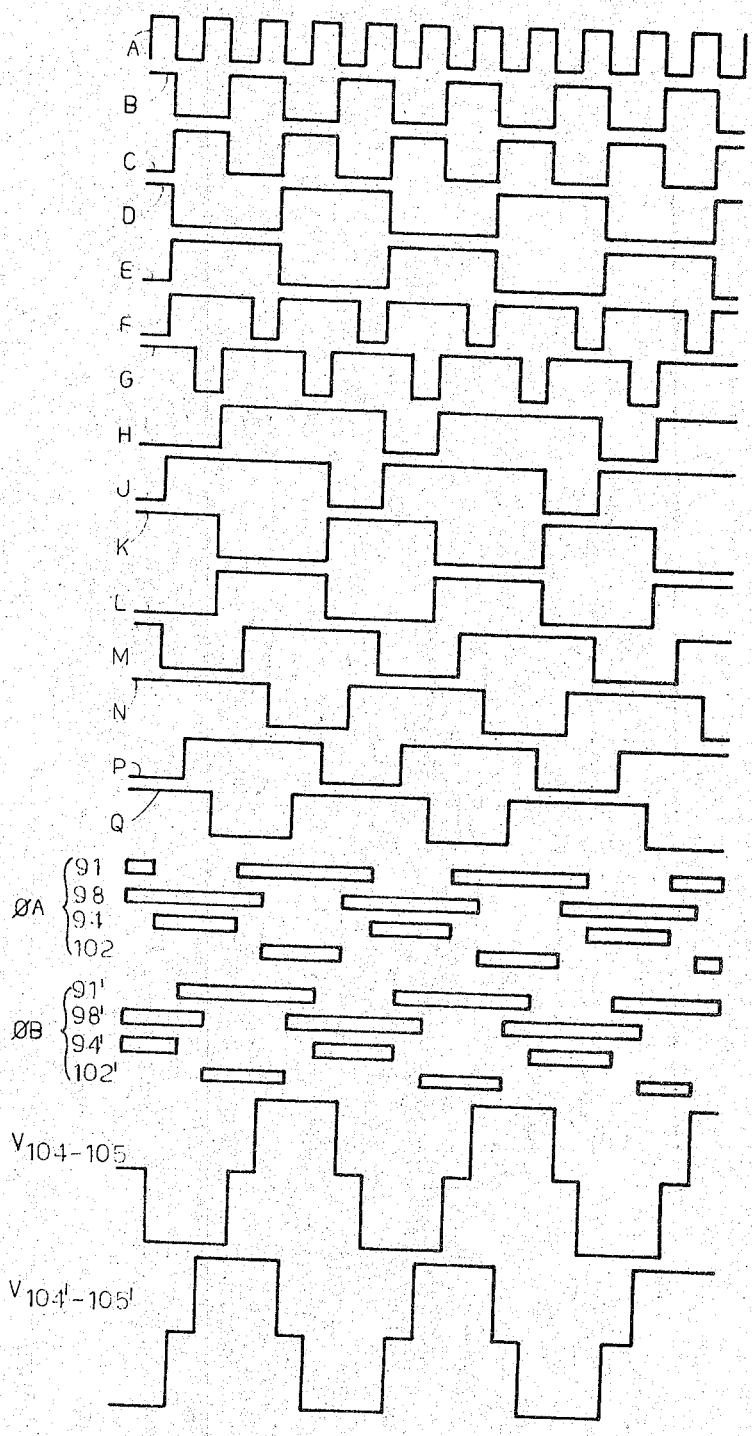
FIG. 4 is a timing diagram showing how the two motor two-phase power is derived from a divided down pulse chain derived from the frequency determining crystal oscillator.

FIG. 3 is a detailed schematic circuit diagram of one of the motor drives 63. This will be described in detail only since the other motor drives, namely 64, 63' and 64' are identical and function in the same manner. The input lines to motor drive 63 are M and N and the motor winding energized by this drive is 106. Typical signals on lines M and N are shown on lines M and N of FIG. 4. Now, tracing the current paths in motor drive 63, when line M is high (positive) as indicated by the higher portions of Line M in FIG. 4, transistors 89 and 90 receive a positive bias on their bases turning them on or rendering them conductive. When transistor 89 conducts its collector to emitter impedance is low shunting the base of transistor 93 to ground, turning it off (non-conducting). When transistor 90 conducts, it forms a path from the plus 5 volts to the base of transistor 91 turning it on (conducting). Now, when transistor 91 conducts, lead 104 is grounded.

When line M is low (zero) as indicated by the lower portions of line M in FIG. 4, transistors 89 and 90 receive no bias and are turned off (non-conducting). With transistor 90 non-conducting, transistor 91 receives no bias and is also off (non-conducting). With transistor 89 off, the base of transistor 93 is not shunted to ground and it receives a positive bias from positive terminal Z and turns on (conducting). When transistor 93 conducts, it supplies positive bias from its emitter to the base of transistor 94 turning it on (conducting). When transistor 94 conducts, it effectively connects line 104 to the positive Y terminal.

In a similar manner, when line N is high, transistors 101, 99 and 98 are rendered conducting and transistors 102 and 103 non-conducting and thus grounding line 105. When line N is low, transistors 101, 99 and 98 are rendered non-conducting and transistors 102 and 103 conducting, connecting line 105 to the plus Y terminal.

With this in mind, when line M is high and line N is low, current flows from the plus Y terminal over line 105, through motor coil 106 and over line 104 to ground. When line M is low and line N is high, current flows from the plus Y terminal over line 104, through motor coil 106 in the opposite direction and over line 105 to ground. All other conditions result in no current through the motor coil 106 i.e., when both M and N are high, both lines 104 and 105 are grounded. It will thus be seen that when M is low, a negative going pulse is applied to motor coil 106 over lines 104 and 105 as shown in curve $^V$104–105 of FIG. 4 and when N is low, a positive going pulse is applied as also shown in curve $^V$104–105. It will be seen that the signals on lines M and N underlap in their low portions at which underlap regions no power is supplied to motor coil 106. In this way the transitions of motor current from positive to negative and negative to positive go through a zero current interval which greatly reduces spikes which would otherwise occur.

Transistors 91, 94, 98 and 102 are power transistors to carry the motor current. The other transistors are used to transform the signal from the low level input logic to the voltages or currents required to switch the power transistors on and off. Diodes 92, 95, 96 and 97 are used to protect the transistors from inductive spikes which generally are encountered in driving inductive loads such as motor coil 106.

In a similar manner the signals shown on lines P and Q of FIG. 4 are applied to a second motor drive circuit as shown in FIG. 3 and a driving current is applied to second phase coil 106' which is 180° out-of-phase with the first current as shown in curve $^V$104'–105' of FIG. 4.

I claim:

1. In a synchronous motor drive system, the combination of;
    a synchronous two phase motor including two sets of windings, one for each phase;
    a crystal controlled high frequency oscillator;
    means for dividing the frequency of said oscillator down to predetermined lower frequency signals;
    means for providing two phase symmetrical bidirectional pulses at a predetermined rate phased 90 degrees apart from said lower frequency signals;
    logic and motor power control means directly coupled between said latter means and the windings of said motor for applying power determined by said pulses to said two phase windings of said motor for rotating said motor in a predetermined direction at a predetermined speed.

2. A two phase motor drive circuit as set forth in claim 1, and including;
    means for providing said pulses with spacing intervals of zero voltage between positive and negative excursions for reducing transients in said motor windings due to pulse excitation.

3. A two phase motor drive circuit as set forth in claim 1, and including;
    means for lowering the frequency of said low frequency signals;
    and means for changing the power to said motor power in accordance with said lowered frequency.

* * * * *